Dec. 6, 1966  C. C. RAYBURN ETAL  3,289,270
APPARATUS FOR ASSEMBLING LEAD WIRES TO CAPACITORS
Filed May 28, 1964
6 Sheets-Sheet 1
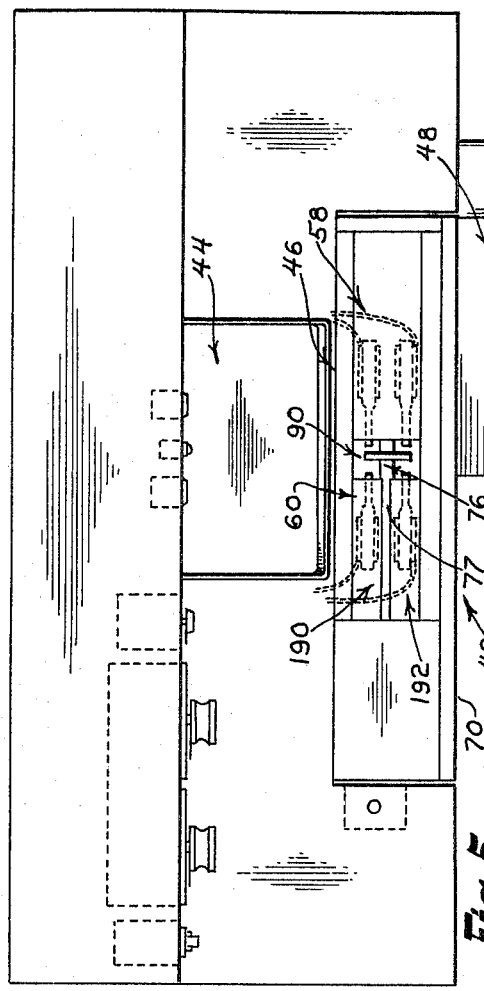
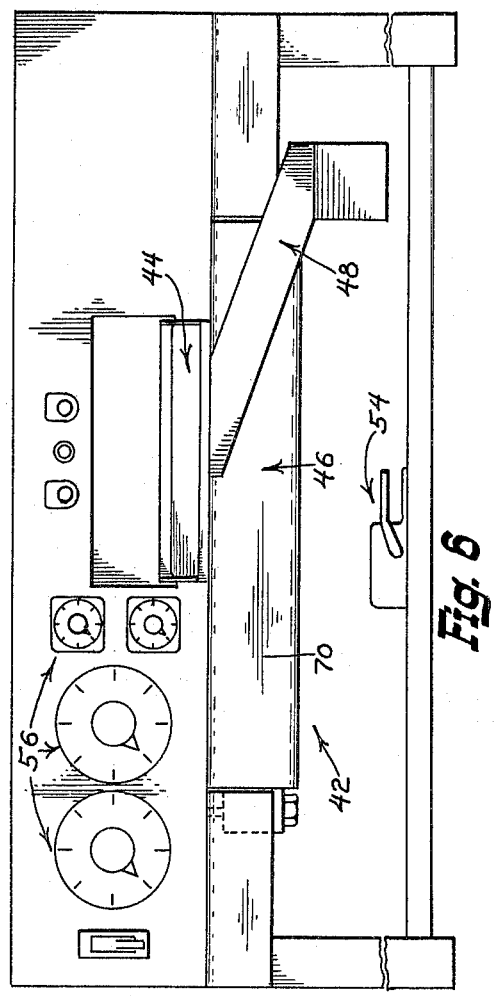
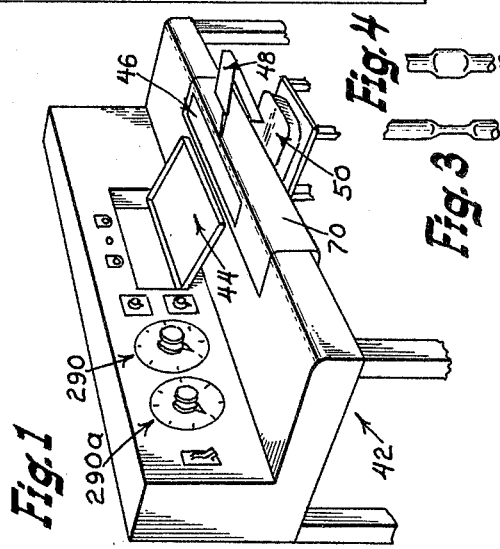
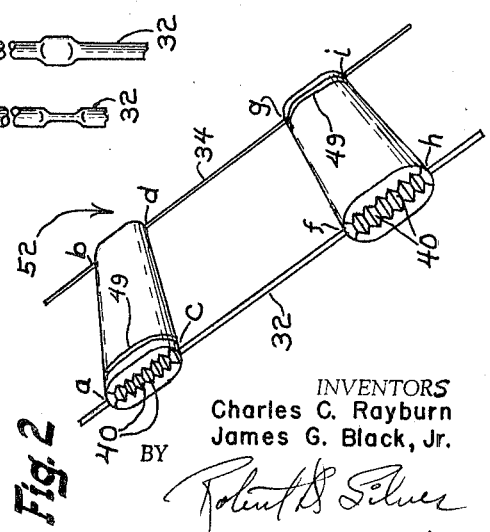
INVENTORS
Charles C. Rayburn
James G. Black, Jr.
BY
Att'y Dec. 6, 1966 C. C. RAYBURN ETAL 3,289,270
APPARATUS FOR ASSEMBLING LEAD WIRES TO CAPACITORS
Filed May 28, 1964 6 Sheets-Sheet 2

INVENTORS
Charles C. Rayburn
James G. Black, Jr.
BY
Att'y

INVENTORS
Charles C. Rayburn
James G. Black, Jr.
BY
Att'y

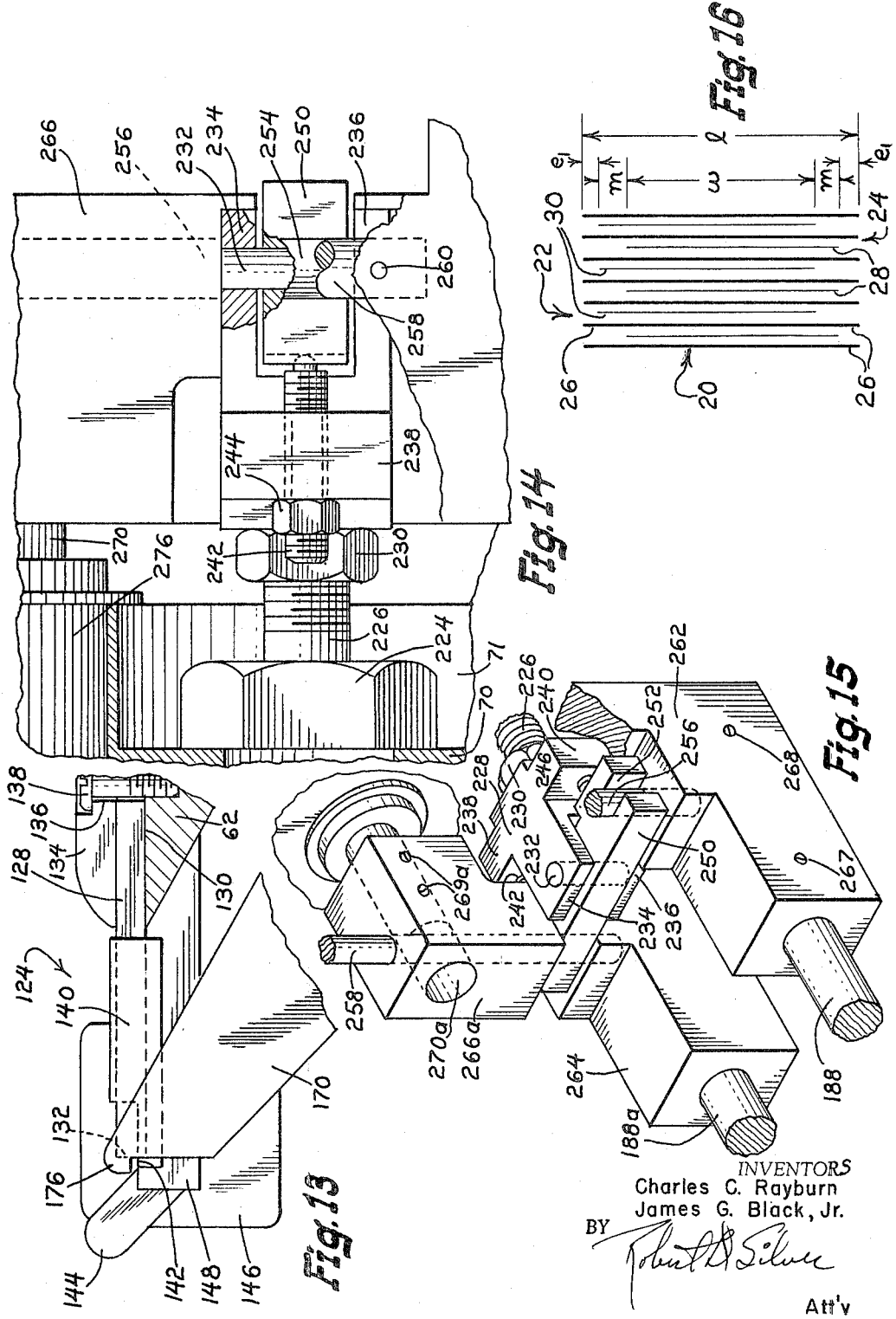

Dec. 6, 1966  C. C. RAYBURN ETAL  3,289,270
APPARATUS FOR ASSEMBLING LEAD WIRES TO CAPACITORS
Filed May 28, 1964  6 Sheets-Sheet 5
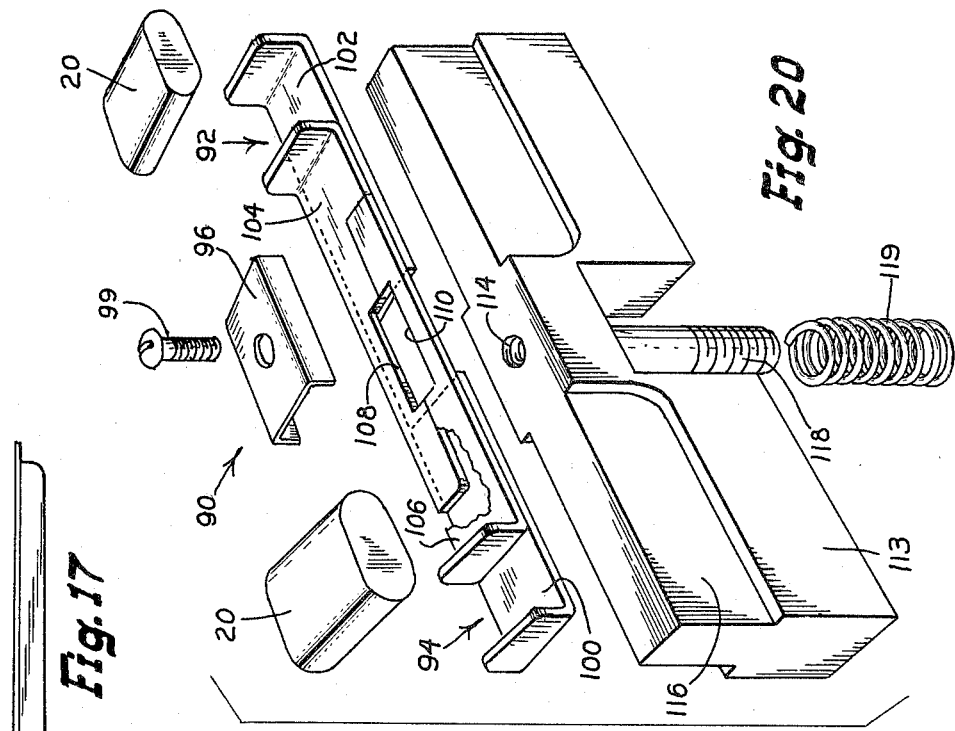
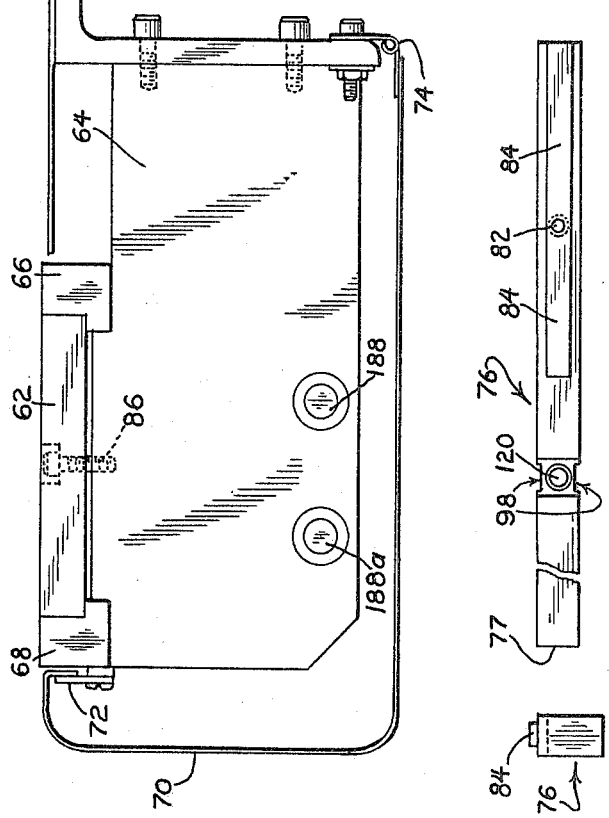
INVENTORS
Charles C. Rayburn
James G. Black, Jr.
BY
Att'y

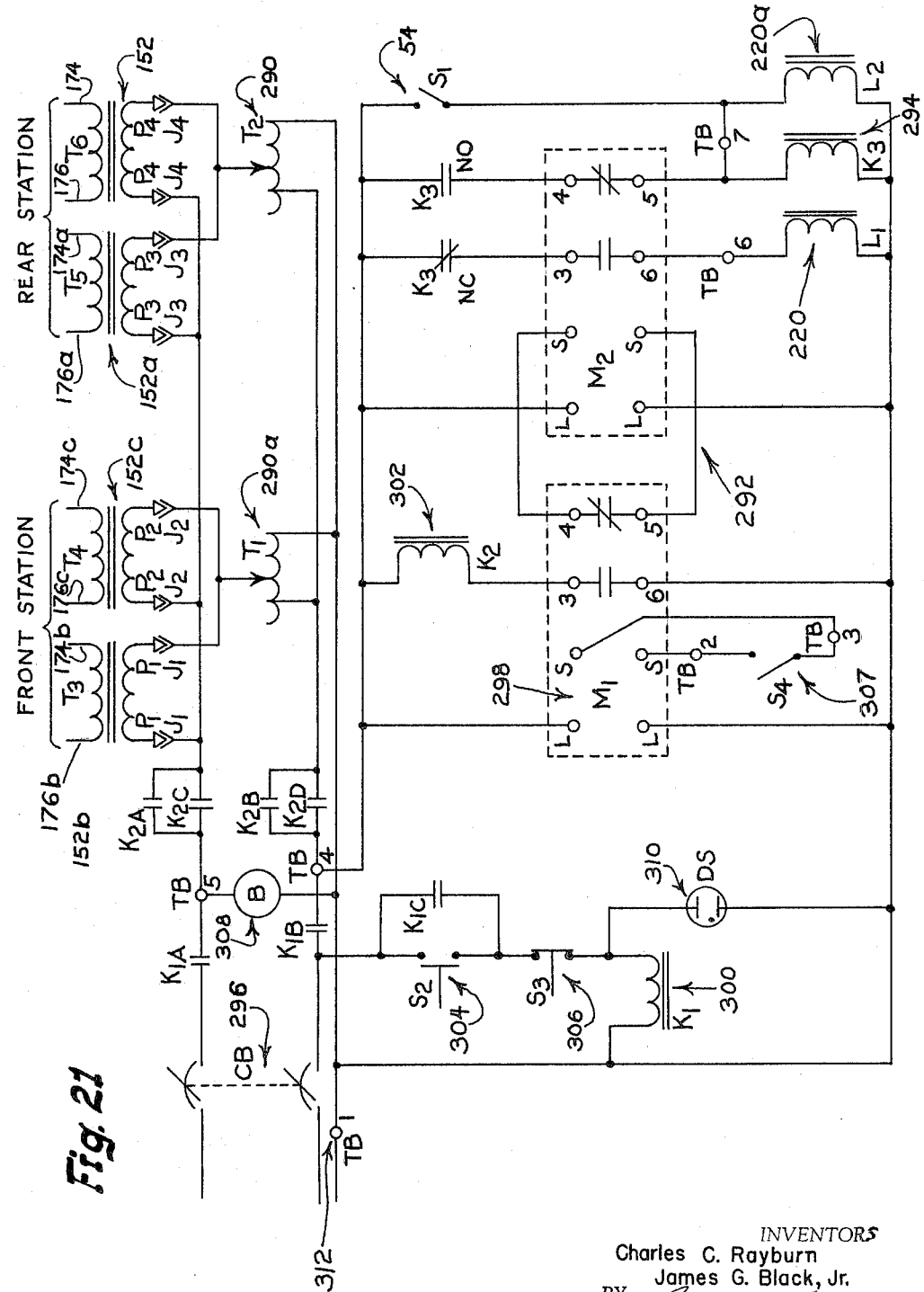

United States Patent Office 3,289,270
Patented Dec. 6, 1966

3,289,270
APPARATUS FOR ASSEMBLING LEAD WIRES
TO CAPACITORS
Charles C. Rayburn, Falls Church, and James G. Black,
Jr., Springfield, Va., assignors to Illinois Tool Works
Inc., Chicago, Ill., a corporation of Delaware
Filed May 28, 1964, Ser. No. 370,824
11 Claims. (Cl. 29—25.42)

This invention relates in general to a method and apparatus for assembling lead wires to capacitors, and, more particularly, relates to a method and apparatus for assembling lead wires to convolutely rolled electrode foils and plastic dielectric films.

This invention is an improvement to the patent application entitled, "An Improved Capacitor Construction and Method and Apparatus for Accomplishing Same," Serial No. 258,574 filed February 14, 1963, assigned to the same assignee and invented by Charles C. Rayburn, one of the joint inventors of the instant application.

Wound capacitors are normally fabricated from strips or tapes of conductive materials, such as a metal or a conductive coated dielectric wound into a tight coil. In winding the capacitor coils, two or more conductive tapes are wound together with dielectric materials between the conductive tapes to insulate them from each other. In forming the capacitor coil, the conductive tapes are staggered so that the end of one tape extends beyond one edge of the other tape, while the opposite edge of the other tape extends beyond the corresponding edge of the first. Thus, normally, in winding the condenser or capacitor coil, two conductive tapes are wound in the staggered arrangement with the intermediate dielectric material positioned only between the overlapping portions of the two tapes. The wound capacitor coil thus has the extending edges of each of the conductive tapes forming a different end of the coil. One lead wire is then conventionally soldered at each end of the coil to portions of the extending edges of the corresponding conductive tape.

While wound capacitors, fabricated from plastic or paper dielectric materials, are in many respects satisfactory, they also have certain disadvantages. For example, it is quite conventional to wind capacitors as above set forth with the conductive tapes being formed of thin tin foil so that a good solder bond may be made with lead wires which are coated with tin so that good low resistance electrical connections can be made. There are at least two major disadvantages to this conventional construction; namely, tin foil is relatively expensive as compared to other materials, such as, for example, aluminum foil, thus greatly increasing the cost of manufacture of the product, and, secondly, the soldered junction of the lead and the thin tin foil has little inherent mechanical strength, so that when the leads are soldered to the edges of the foil tape, extreme care must be exercised in the use of the capacitor to prevent tearing way of the lead from the capacitor.

Aluminum foils have been attempted for replacing the tin foils in a wound capacitor but the difficulties in obtaining a good connection of the lead wires to the aluminum foils have prevented the widespread use of this more economical foil material. It should be noted at this juncture that it is preferable that the lead wires be of conventional materials, such as tin coated copper or steel cored copper or copper materials which are easily soldered to other circuits. Thus, the expedient of using aluminum wire leads with aluminum foils does not present an acceptable construction for the capacitor market.

In the aforenoted patent application, there is shown a method and apparatus for providing an improved capacitor construction wherein the leads are disposed transversely to the capacitor coil and are locked into engagement with the foils by a heated and then fused portion of the dielectric materials, the lead wire to capacitor coil connection being characterized as providing a uniform contact of the lead wires with all the convolutions of the electrode foils, a good thermal coupling of the individual leads to the electrode foils to prevent excessive heating of the leads in the assembly operation (and, further, boils up plastic at the exact junction of the leads and the individual coils of the foil to afford an exceptionally good foil to lead contact at relatively high speeds), and the provision of a rib or ribs of fused plastic material which extends substantially transversely to the axis of the lead wires to provide extremely good pull-out strength and to firmly bond the lead wire to the capacitor coil.

The instant invention is directed toward the concepts and structure for automatically simultaneously assembling a plurality of capacitors utilizing the basic teachings of the aforenoted patent application.

More particularly, it is an object of this invention to provide a method and apparatus for assembling a plurality of rolled capacitors having electrode foils and dielectric means of thermoplastic material, the lead means being disposed transversely of the end surfaces of the coils and locked to the capacitor construction to provide superior capacitors.

A most important object of this invention is to provide a versatile machine for automatically assembling capacitors of the aforenoted type which is readily adapted to assemble capacitors of varying length, and width, and is also adjustable for different lengths and types of lead wires.

A further object of this invention is to provide a method and apparatus which affords balanced pressure of a rib former on the end surfaces of each of a plurality of capacitors during the simultaneous assembly thereof, to thereby afford good uniform capacitor construction independent of dimensional variances that may be encountered.

A further object of this invention is to provide an assembly apparatus which may be readily adapted to semiautomatic operations and may be adapted for conversion to automatic operation for long term runs.

Another and important object of this invention is to provide a rib former and electrode mechanism wherein the rib former provides all the force in moving the respective lead wires into engagement with the capacitor end surfaces, the electrode means which provides the heating of the capacitor lead wires during assembly of the lead wires, being movable with the rib former means with an engaging force with the lead wires in a direction at right angles to the movement of the rib former means to thereby firmly engage the lead wires for good electrical connection thereto but in a manner so as to not interfere with the operation of the rib former means.

The novel features that are characteristic of the invention are set forth with particularity in the appended claims. The invention itself, both as to its organization and its method of operation, together with additional objects and advantages thereof, will best be understood by the following description of specific embodiments when read in connection with the accompanying drawings in which:

FIG. 1 is a perspective view of an apparatus embodying the concepts of the instant apparatus for assembling capacitors;

FIG. 2 is a perspective view of an assembly formed by the apparatus shown in FIG. 1;

Figure 10:
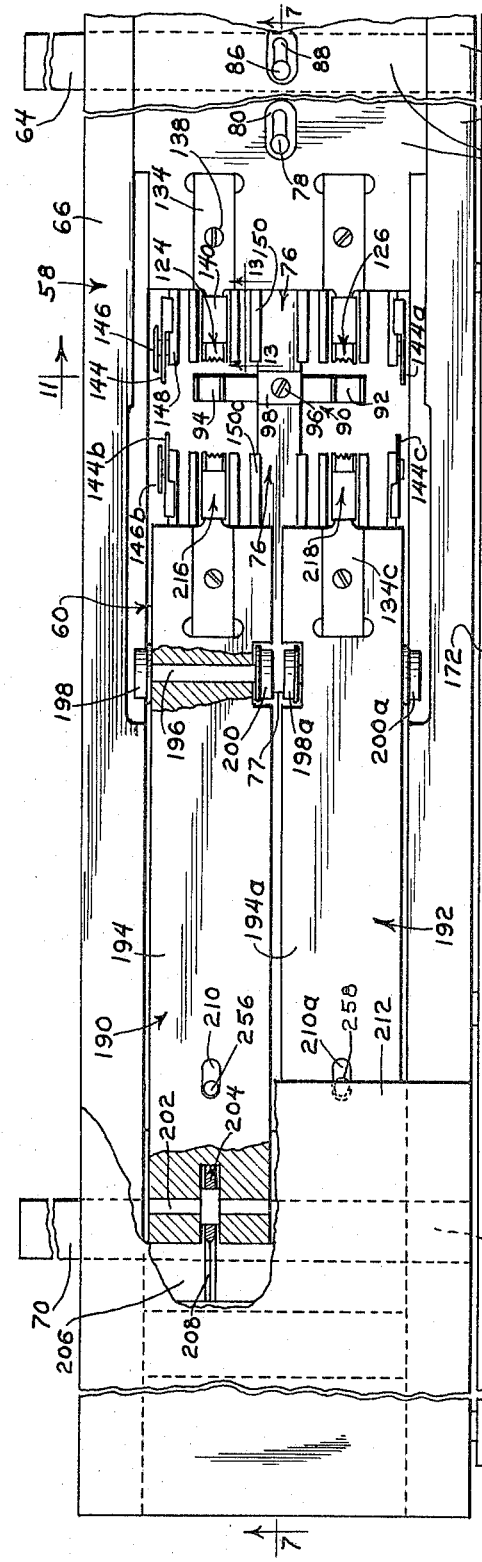
Figure 11:
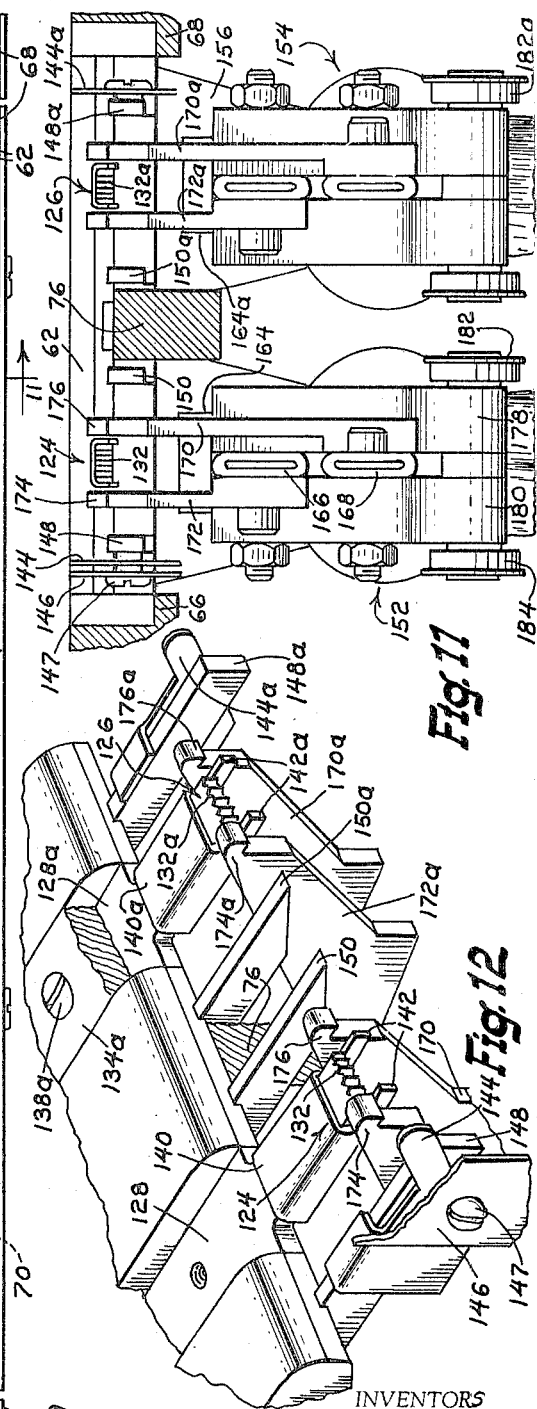
Figure 12:
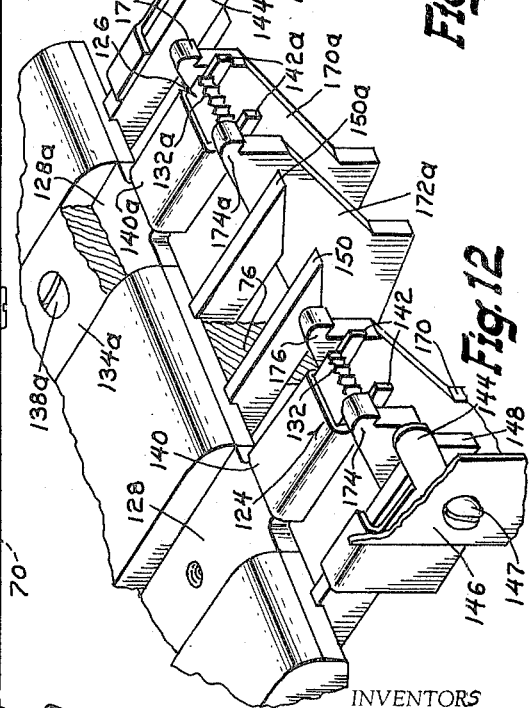

FIGS. 3 and 4 are views of the lead wires used to assemble the construction shown in FIG. 2, views 3 and 4 being taken at 90° to each other to show the antirotational upsets for the lead wires;

FIG. 5 is a top plan view of the apparatus shown in FIG. 1;

FIG. 6 is a front elevational view of the apparatus shown in FIGS. 1 and 5;

FIG. 7 is a side elevational view, on an enlarged scale, of the essential moving parts of the apparatus shown in FIGS. 1, 5, and 6;

FIG. 8 is a front elevational view of one form of final capacitor construction obtainable from the assembly shown in FIG. 2;

FIG. 9 is a front elevational view of another form of capacitor construction obtainable from the ladder-like chain shown in FIG. 2;

FIG. 10 is a top elevational view, partially foreshortened on the right hand end thereof, of the apparatus shown in FIG. 7;

FIG. 11 is a sectional view along lines 11—11 of FIG. 10;

FIG. 12 is a partial perspective view of the apparatus shown in FIG. 11;

FIG. 13 is a partial sectional view along lines 13—13 of FIG. 11;

FIG. 14 is an enlarged sectional view of the left hand portion of FIG. 7;

FIG. 15 is a perspective view, partially in section, of the portion of the apparatus shown in FIG. 14;

FIG. 16 is a semidiagrammatic view of a capacitor blank, in section, of the type for which the instant apparatus is efficacious in assembling lead wires thereto;

FIG. 17 is an end view along lines 17—17 of FIG. 7;

FIG. 18 is an end view of the center track in detached relationship;

FIG. 20 is a perspective view of the capacitor loading station; and

FIG. 21 is a block diagram of the circuit used in the apparatus.

Before discussing the apparatus in detail, a short discussion of the capacitor blank 20 is perhaps in order, although for a fuller discussion of the concepts and structure surrounding the configuration of the capacitor blank, reference is had to the aforementioned Rayburn application which is incorporated by reference hereto. An axial sectional view of a capacitor blank 20 is shown in FIG. 16 having end surfaces 22 and 24 and comprises convolutely wound electrode foils 28 and 30 which are separated by a plastic dielectric film means 26. In practice, two identical films 26 are used to separate the two foils 28 and 30 in most capacitors, however in very small capacitors, in order to provide sufficient plastic for bulk purposes the films may not be identical in thickness. Elongated lead means 32 and 34 are adapted to be heated electrically by a short duration, heavy electrical current while being forced inwardly, i.e., toward each other, to become lead wires for the capacitor. The techniques for automatically accomplishing this is by the apparatus 42 set forth in detail hereinafter. In winding the capacitor blanks 20, to produce the products such as 30a and 30b shown in FIGS. 8 and 9, it is preferable to wind an overwrap layer or layers of plastic film to provide mechanical and moisture protection to the generally cylindrical coil. It is also advantageous to flatten the coil from the original wound configuration to provide a somewhat oblated cylinder as shown in FIG. 2. This substantially reduces the area of empty space in the center of the capacitor (the capacitor as wound has a central through hole formed by the winding mandrel). In commercial practice, a number of double overwraps, varying from two to twelve, may be used depending upon the design requirement of the capacitor. It is possible to use an insert (not shown) adjacent the last outerwrap, the insert being essentially the same width as the plastic dielectric 26 and the overwrap extension thereof. The insert may be colored and preprinted and, since the plastic dielectric is preferably clear, this provides a convenient automatic way of identifying the characteristics of the capacitor. Also, the capacitor may be postdipped in wax or other impregnant and printed on the exterior to identify the voltage ratings, etc., of the capacitor, although if the wax is not too translucent, it is possible to print directly on the film and then dip or impregnate with wax which has the advantage of protecting the printing also.

As aforediscussed, the elongated lead wires 34 and 32 are assembled to the ends of the capacitor blanks by passing a short duration, high amperage current through the lead wires while moving them toward the ends of the capacitor blanks. This heats up the lead wires in those portions that are going to engage the end surfaces to, in turn, cause the plastic dielectric to melt and the lead wires to embed themselves in contact with the foils adjacent the respective ends of each of the capacitor blanks. As will become apparent through the discussion of the apparatus, there preferably is a rib former means for each end of each capacitor, two of which are actuated by an actuation means while the lead wires are being heated by suitable electrode means. Each rib former means has teeth thereon having spaces between the teeth which cause the plastic dielectric to flow into a plurality of rib-like shapes shown in FIG. 2.

A plurality of rib-like structures is formed on the capacitor end which is basically of clear heated and then cooled plastic which was originally the extension of the dielectric which was heated up and molded by the hot lead wires and the cooperation of the rib former during the assembly thereof. The individual rib is preferably of somewhat triangular shape conforming to the configuration of the spaces between the teeth of the rib former, the top of the individual rib corresponding to the valleys between adjacent teeth. The two sides of the rib are formed by the sides of the teeth where the valleys between the ribs are formed by the extreme tips of the teeth. A very small portion of the lead wire is exposed in the valleys where the rib former engages the wires.

The particular values and equations relating to the blank 20 shown in FIG. 16 and the considerations for these values and equations relating to the overall length $l$, the active width of the electrical field $w$, the margin $m$, and the dielectric extension wherein the plastic material 26 extends axially beyond the furthermost edge of the adjacent foil $e_1$ are set forth with particularity in the aforenoted Rayburn patent application.

Turning now to the apparatus 42, shown in FIGS. 1, 5, and 6, there is shown a semiautomatic capacitor assembly apparatus which is integrated into a bench mounting at which an operator may sit. The capacitor blanks 20 may be disposed in a tray 44 and lead wires such as 32 and 34 having upsets therein may also be disposed therein prior to the assembly. The lead wires are identical and the upsets are to prevent rotation of the lead wires to the coil after assembly thereof. The working area 46 is adjacent the front edge of the bench, there being a chute 48 leading to a pan 50 for receipt of the assembly 52 formed by the machine. A switch 54, is adapted to be operated by the foot of the operator to initiate the cycling of the machine, and there being various dials and indicators 56 on the vertical portion of the table top assembly for adjusting various variable values in the operation.

The working area 46 essentially comprises a right hand carriage means 58 and a left hand carriage means 60, there being a capacitor locating means 90 located therebetween on a center track tongue means 76 as shown in FIG. 1. The right hand carriage means 58 is adjustably fixed to the frame as shall be explained, and the left hand carriage means 60 moves relative to the carriage means 58. In essence, the right hand carriage means 58 provides the reaction force in the assembly operation and the left hand carriage means 60 provides the movement of one lead wire and the capacitors into engagement with the other lead wire which is in fixed relationship to the carriage 58, as shall become apparent. The carriage 58 is adjustably located relative to the frame to accommodate different sizes of capacitors, as shall be explained.

Both carriages have portions that move in a vertical plane on each cycle (the electrodes), and the left hand carriage only has a horizontal reciprocatory movement of the rib former means.

The right hand carriage means 58 comprises a cover plate 62 which is mounted between a pair of oppositely disposed L-shaped rails 66 and 68 which, in turn, are fixedly mounted to cross plate 64 and 70 which are firmly mounted to the frame of the bench. The plate 62 is mounted for adjustable movement by a headed bolt 86 cooperating with a slot 88, the bolt 86 being threadedly mounted in a suitable bore in fixed cross member 64 (see the bottom portion of FIG. 7).

Referring to FIG. 17 and FIGS. 1, 5 and 6, there is shown an outer shell cover member 70 which has a hook portion at the upper end for fitting over a spaced bar 72 and which has a spring loaded pivot mounting at 74 for access to the moving parts of the apparatus. The shell cover member 70 protects the operator from the movement of the parts during the cycle of the apparatus. The upstanding hook bar 72 is fixedly mounted to the outboard edge of rail 68.

The center track means 76 is adjustably fixedly attached to the cover member 62 on the underside thereof, and extends partially across the left hand carriage assembly 60 to point 77. The center track tongue means 76 supports the capacitor locating means 90 and also performs, in the area adjacent end 77, as the track means for the inboard wheels of the two electrode subassemblies of the left hand carriage means. The tongue means 76 is mounted to the cover means 62 by a headed bolt 78 cooperating with a slot 80, the bolt 78 going into a threaded bore 82 in the center track means 76. By loosening bolt 78 and sliding a raised tongue 84 which cooperates with a complementary groove in the underside of the cover 62, the center track means may be adjusted to thereby vary the location of the capacitor locating means 90. (See FIGS. 18 and 19 for details of the center track means.) The location of the capacitor locating means 90 may thus be adjusted in two ways, i.e., by sliding the track 76 relative to the cover 62 and/or movement of the cover means 62 relative to fixed cross support 64.

The capacitor locating means 90 has first and second capacitor receiving means 92 and 94 for receipt of the blanks 20 as shown in FIG. 20. The capacitor receiving means 92 and 94 are made up of two sets of identical members 100, 102 and 104, 106 which are held in place by a U-shaped central cover member 96 with a threaded member 99 which locates the members 100, 102, 104, and 106 in threaded aperture 114 in member 113. Member 113 fits in a notch 98 of the center track member 76 so that projecting pin 118 can cooperate with bore 120 of center track member 76 for threaded association with knob member 122. As will be apparent from FIG. 20, members 106 and 104 are identical and have cut out opposing notches 108, 110 for receipt of bolt member 98 and provides adjusting movement of members 104 and 106 to adjust to different widths of capacitors of the same length. Different members 100, 106, 102, and 104 are required for different lengths of capacitors. The knob 122 together with a loading spring 119 permits vertical adjustment of locating means 90 and screw 99 permits easy removal and insertion of new capacitor locating means 90 when a capacitor of a different length is being formed in the apparatus.

Stationary rib former means 124 and 126 are located opposite (in the horizontal plane) the capacitor locating means 94 and 92. See FIGS. 10, 11, and 12. Since the rib former means 124 is substantially identical to the rib former means 126, only one will be described with the same reference numerals used relative to the other with the addition of a suffix $a$.

The rib former 124 comprises an elongated member 128 which fits in an appropriate channel 130 in the end portion of cover member 62 (see FIG. 13), a hold down plate 134 has an aperture aligned with through bore 136 in member 128 for receipt of a bolt member 138 which fixedly mounts the rib former. The outboard end 132 of the rib former is of toothed construction, more particularly described in the copending application of Rayburn, aforementioned. A U-shaped stainless steel stamping 140 overlays the extending end of the rib former in the neck portion thereof and has a pair of forwardly extending wings 142 which closely hug the rib former and project therebeyond. (See FIGS. 12 and 13.) Lead wire locating means 144 and 146 are attached to an outwardly extending rail 148 by a bolt 147. The upstanding end of member 144 is disposed at an angle to vertical, and together with the corresponding member 144$a$, cause a lead wire to slide down into engagement with the teeth on the outboard ends 132 of the two rib formers 124 and 126. The lead wire is supported on rail 148, the two extending ends 142 of member 140, the two extending rails 150 and 150$a$ which project slightly above the center track 76, ends 142$a$ of member 140$a$, rail 148$a$ and member 144$a$. Due to inclination of member 144, they are located by gravity against the teeth of the rib former.

Vertically extending end plates 146 serve as a locating stop for the ends of the lead wires and assure that the upsets in the lead wires (see FIGS. 3 and 4) are located immediately adjacent the teeth 132 so that they will center upon the center of the ends of the capacitor blanks disposed in the respective stations 92 and 94.

The right hand carriage assembly 58 mounts left and right hand (as viewed in FIG. 11) stationary electrode gun means 152 and 154. Since these assemblies 152 and 154 are identical, only the left hand assembly 152 shall be discussed in detail and the same numbers apply to the assembly 154 with the addition of the suffix $a$. The gun assemblies 152 and 154 are stationary in the horizontal plane but are movable in a vertical plane by a cam assembly to be described. The assembly 152 is mounted to cover plate 62 by a fixedly mounted triangular shaped depending member 156 having an aperture adjacent the apex thereof which mounts a threaded member 158 having a spherical surface 160 thereon as shown in FIG. 7. An insulating plate 164 has a depending member 162 having a surface for cooperation with the ball joint spherical surface 160 of member 158 and insulating member 164 is fixed to the upper winding extension of the electrode gun 166. The upper winding 166 terminates at the left hand portion of the gun as shown in FIG. 11. The lower extension of the other winding of the electrode gun 168 comes out parallel to the upper extension of the upper winding 166 and terminates parallel thereto. Terminal 166 is attached to heavy copper electrode 172 and terminal 168 is attached to heavy copper electrode 170, each of which have hook-like upper extensions 174 and 176 as best perceived in FIG. 12. Members 170 and 172 are preferably formed of relatively thick copper to carry heavy current loads. The underside of the hook-like extensions 174 and 176 rest upon the top edge of the lead wires to be assembled to the capacitor blanks immediately adjacent the wings 142 of members 140 surrounding the rib former means. As can be perceived by FIG. 13, the underside of the hook-like member will rest upon a lead wire that is disposed on the extensions 142.

Depending members 178 and 180 are mounted to the gun 152 and are formed of insulating material to mount rollers 182 and 184 at the bottom ends thereof for cooperation with cam means 186 mounted on movable rod 188.

Each electrode gun means 152 and 154 is mounted on a three-point suspension, i.e., the ball joint 160 and the two hook portions 174 and 176 which engage the lead wire when cam rollers 182 and 184 leave the cam 186 upon movement of the rod 188 to the right as viewed in FIG. 7; thus, even balanced pressure is placed upon the lead wires by the two hooks 174 and 176 by the weight of the electrode gun. It will be noted that the copper electrodes 170 and 172 are held against the lead wires by gravity and that this force is perpendicular or at a substantial angle to the force exerted on the wires by the rib formers. Contact pressure of the lead wire to the electrodes 174 and 176 is constant since it is determined by the weight and the mounting of the high current transformer or gun. The center of gravity of the gun assembly is approximately one-two inches below the plane described by the three-point support after the rollers leave contact with the cam 186. This distance is chosen to reduce the sensitivity of the support, yet achieving approximately equal support on each contact. This has proved efficacious in preventing a poor electrode to lead wire contact which, due to the relatively heavy, short duration, current used to heat the lead wires, must be of a low resistance nature to prevent arcing at this point with consequent degradation of the lead wire.

The left hand assembly 60 comprises first and second movable subcarriage means 190 and 192. The subcarriage means 190 and 192 are essentially identical and are actuated by a single actuator (to be described later), although they have a slight floating action therebetween as shall be explained. Since the subcarriage means 190 and 192 are identical, only the subcarriage 190 shall be described, the subcarriage 192 being identified by similar reference numerals with the addition of the suffix *a*.

The subcarriage 190 has a cover plate 194 and is formed with a bore for receipt of a roller shaft 196 which mounts rolls 198 and 200 adjacent the right hand end as viewed in FIG. 10. Roller 198 rolls on L-shaped rail 66 and roller 200 rolls on the center tongue 76. Adjacent the left hand end of cover member 194 is a bore for receipt of roller shaft 202 which mounts a single roller 204 which rolls on a V-shaped track 208 in member 206 which is mounted parallel to cover member 194 on fixed frame member 70 (see FIGS. 7 and 10).

Each of the left and right hand carriage means 190 and 192 have a slot 210–210a which provides a lost motion connection to the actuator means as shall be described.

A thin sheet metal basal or cover portion 212 is mounted by a suitable screw 214 to a cross member 280 mounted between the rails 66 and 68.

Adjacent the front end of the left and right hand subcarriage means 190 and 192 of carriage 60 are rib former means 216 and 218. The rib formers, rails, supports, etc., for the lead wires and the transformer gun and the hook-like electrodes therefor of the rib former means 216 and 218 are in mirror image symmetry to the rib formers 124 and 126 and similar parts are given similar reference numerals with the addition of the suffixes *b* and *c*.

The actuator means 220 is in the form of an electrically actuated air cylinder having an extension 222 which is locked to a cut out portion 71 of frame member 70 by a suitable nut 224. A threaded movable extension 226 mounts to a clevis member 228 there being a suitable jam nut member 230. Clevis member 228 has a pin 232 that extends between two forwardly extending U-shaped arms 234 and 236 for transmitting power to the actuator link 250, clevis member 228 having outwardly extending wings 238 and 240 each of which have bores therein to mount spring loaded plunger members 242 and 246 having locking nuts 244 associated therewith. Reciprocatory power is put into the actuator link 250 by the pin 232 and the amount of relative float movement of the two wing portions having grooves 252 and 254 in the ends of the actuator link is determined by the two adjusting members 242 and 246. Upstanding pins 256 and 258 are respectively mounted in the slots 252 and 254 and they are fixedly mounted at their bottom ends by pins 260 to blocks 262 and 264 respectively which are, in turn, respectively fixed to actuator rods 188a and 188. The upstanding pins 256 and 258 extend through upper block portions 266 and 266a for cooperation with the slots 210 and 210a as shall be explained. The upper block portions 266 and 266a are mounted to rods 270 and 270a. The elongated rods 188 and 188a are respectively mounted in bushings 272 and 274 and 272a and 274a which are each, in turn, mounted to the cross members 64 and 70 which are, in turn, mounted to the frame. Bushings 276 and 276a mount rods 270 for movement therein. It will be understood that the rods move with a reciprocatory motion on each cycle of the machine in the respective bushings. Thus, block 262 is mounted to rod 188a by pins 267 and 268 and block 266 is mounted to rod 270 by pins 269. Movement of the air cylinder actuation means 220 causes movement of the clevis member and actuator link to engage upstanding pins 256 and 258 which cause the movement of rods 188 to, in turn, cause movements of cams 186, 186a, 186b, and 186c to allow the electrodes to firmly engage the lead wires and after sufficient travel cause movement of subcarriages 190 and 192 through cooperation with the slots 210 and 210a.

Adjustable biasing means 278 engages each of the top cover means 194 and 194a of the subcarriage means 190 and 192 to bias said cover means to the right as shown in FIG. 7. The adjustable biasing means 278 comprises a knob member and rod 282 extending through a cross frame member 280 having an end surface 284 which engages both of the top cover means 194 and 194a at the left hand end thereof. A spring 286 surrounds the rod 282 and loads the end 284 to the right. An adjustable stop nut 288 limits the travel of the bias means thereby assuring that the left hand edge of the slots 210 and 210a always engage the respective pins 256 and 258 at the start of each cycle.

FIG. 21 is a diagrammatic showing of the electrical circuitry of the apparatus. All of the components are conveniently wired to a terminal board 312 which is identified in the circuit as TB with the various terminals being identified with numbers. Adjustable transformers 290 and 290a are used to vary the input power to the electrodes 174, 174a, 174b, 174c, 176, 176a, 176b, and 176c through the transformer guns 152, 152a, 152b, and 152c. Suitable cord connectors identified by the reference letters $P_1$, $P_2$, etc., and $J_1$, $J_2$, etc., connect the soldering transformers to the circuit. Suitable three pole commercially available contactors with an auxiliary contact are identified by reference numerals 300 and 302. A single pole double throw relay 294, the advance coil 220, and retract coil 220a of the air cylinder means are shown in the lower right hand corner of the circuit and the foot switch 54 is shown thereabove. A time delay relay 292 and an interval timer 298 are shown, there being a pressure switch 307 associated with the interval timer 298 which determines the duration of the current impulse to the electrodes engaging the lead wires. The time delay relay 292 determines the interval of cooling time before the air cylinder is retracted. A blower 308 may be wired into the circuit to blow heat away from the working area. Pilot light 310 may be provided to show the power of the circuit there being a start switch button 304 and a stop switch button 306 in the circuit. Overload protection may be provided by a circuit breaker 296 which is of the conventional variety.

*Operation*

The machine is set up with rib former sets (a set consists of four identical pieces) which are selected to accommodate the capacitor width dimensions. One set may be used on any length of capacitor of the given width.

Differing capacitor lengths are satisfied by varying the location of the right hand gun assembly (loosening bolt 86 and adjusting the cover 62). The capacitor locating means 90 is also selected for differing lengths and is adjusted for the required width. It will be noted that the capacitor locating assembly means 90 uniquely maintains equal width for both capacitors and on a fixed center spacing. The copper electrode members 170, 172, 170a, 172a, 170b, 172b, 170c, and 172c are selected to match the rib former widths 124, 126, 216, and 218. It is necessary that the electrode members 170–172, etc., maintain an intimate position with the rib formers so as to give minimum wire lengths passing current which are not in contact with the capacitor. If there is extensive free wire, the temperature will elevate very rapidly in the free wire area which, in turn, increases the resistance and power dissipation in that free segment. A long segment if free in air will heat with the high current applied and thereby limit power in the wire to foil joint areas. By having the electrodes intimate with the wire formers this is prevented.

The sequence of operations is as follows: The operator loads both lead wires and makes sure that the wires are against the end stops 146 and 146b so as to locate the antirotation upsets in the lead wires so that they will fall in the center of the capacitor cross section. The next step for the operator is to load both capacitors; the capacitor blanks may be loaded with the electrostatic foils 49 on the same side or on different sides depending upon whether or not the capacitor construction 30a or 30b is to be formed. If the capacitor construction 30a is to be formed (referring to FIG. 2), the final construction is snipped with wire clippers at points a, d, f, and i. If the construction shown in 30b (FIG. 9) is desired, then the coils are loaded with the electrostatic shields and other markings in identical orientation and, depending upon the length the lead wire is desired, the wires are appropriately snipped to give desired capacitor construction.

After the capacitors are located, the foot switch 54 is actuated by the operator. Coil 220 causes the air cylinder to actuate the actuator link 250 to cause the cams 186, 186a, 186b, and 186c to move to the right as viewed in FIG. 7 to, in turn, allow the hook-like projections on the electrodes 174, 176, etc., to engage the lead wires. Rib formers 216 and 218 through pins 256 and 258 cause the left hand lead wire to engage the end surface of the capacitor and clamp the wire against the leading edge of the capacitor to cause the capacitor to engage the right hand lead wire adjacent rib formers 124 and 126. When sufficient pneumatic pressure builds up, the pressure switch means 306 turns on power to the electrodes which causes the lead wires to heat up in those portions adjacent the capacitor ends. After a preset time interval, determined by the interval timer means 298, the power is turned off and after a suitable preset cooling time, determined by the time delay relay 292, the pressure to the rib former is released. The retract coil 220a of the air cylinder is actuated bringing the parts back to their initial position. The cam members 144b and 144c tilt upon retracting movement of the left hand carriage assembly and the operator manually removes the subassembly 52 shown in FIG. 2. The operator then places the subassembly in a chute 48 so that the subassembly will drop into a tote pan 50.

While this machine has been discussed as a semiautomatic machine using operator labor to manually load the lead wires and capacitors, and to remove the final assembly, it is well adapted for automation. However, the versatility afforded by operator labor for short production runs and easy changeover of equipment equates well with the semiautomatic machine and method as above described.

Although a single embodiment of the invention has been shown and described, it is with full awareness that many modifications thereof are possible. The invention, therefore, is not to be restricted except insofar as is necessitated by the prior art and the spirit of the appended claims.

We claim:
1. Apparatus for assembling electrical components comprising:
   A. means for receiving and locating a plurality of spaced substantially parallel elongated conductors at a single assembly station;
   B. means for receiving and locating at said station a plurality of electrical components having heat deformable end portions in parallel array;
   C. clamping means adjacent each end of each component for clamping the parallel elongated conductors with a predetermined force against each end of said components;
   D. electrical heating means positioned adjacent each of said clamping means for heating selected portions of said elongated conductors, said heating and clamping means cooperating to force the conductors to deform said end portions permitting said conductors to be embedded in the end portions of said electrical components;
   E. time responsive means for terminating the electrical energy to said heating means;
   F. time delay means for maintaining a clamped relationship of said conductor to said electrical bodies to provide a predetermined cooling and fusing time subsequent to termination of the electrical energy to said heating means; and
   G. means for removing said clamping means after said elongated conductors have been embedded in said component.

2. Apparatus for assembling capacitors comprising adjustably fixed carriage means having first and second capacitor engaging portions thereon, first and second movable subcarriage means having respectively third and fourth portions in opposition to said first and second portions respectively of said adjustably fixed carriage means for engaging opposed portions of said capacitors to clampingly engage same, means for locating a pair of capacitors between said first and third, and second and fourth capacitor engaging portions on said adjustably fixed carriage means and said first and second subcarriage means, means associated with said adjustably fixed carriage means and said first and second subcarriage means for receiving a pair of spaced elongated lead wires, electrode means for engaging and heating said lead wires, means for actuating said first and second subcarriage means and causing said electrode means to engage said first and second lead wires to thereby cause relative movement therebetween and clamping engagement with opposed surfaces of said capacitors, said electrode means being engageable with each lead wire for heating short segments thereof adjacent each capacitor after a predetermined clamping pressure of said lead wires against the opposed surfaces thereof, and means insuring that said electrode means physically engages said lead wires prior to contact with said capacitor opposed surfaces and is electrically actuated subsequential to clamping pressure of said lead wires against said end surfaces.

3. The apparatus set forth in claim 2 wherein said first and second subcarriage means are mounted for reciprocatory movement toward and away from said fixed carriage means.

4. The apparatus set forth in claim 3 wherein said means actuating said first and second subcarriage means comprises an actuator and yoke means for evenly dividing the power of the actuator to place evenly divided actuator pressure on said lead wires.

5. The apparatus set forth in claim 2 wherein said electrode means comprises four independently mounted electrode gun means each having a pair of hook projections for engaging the lead wire adjacent the portions contacting the capacitor bodies, each of said gun means having a ball joint means at a portion remote from the hook-like portions thereof to provide mounting thereof to the adjustably fixed carriage means and the first and second subcarriage means whereby balanced pressure of said hook projections on said lead wires is obtained.

6. The apparatus set forth in claim 5 wherein said electrode gun means are actuated into engagement with said lead wires by cam means associated with the means for actuating said first and second subcarriage means.

7. In a rolled capacitor assembling machine, means for receiving a plurality of cylindrical capacitor blanks having plastic heat deformable end portions at a single assembly station, means for receiving and locating spaced elongated conductors adjacent said end portions, means at said station for physically and electrically joining said conductors to each of the blanks comprising forcing tool means and electrical means, said electrical means contactting each of said conductors at spaced points for heating selected portions of each of the conductors immediately adjacent the blanks, said forcing tool means being movable into contact with said conductors and capacitor plastic end portions to bondingly join the heated conductors to the blanks and deform the plastic portions so that areas thereof overlie the conductors at the end of each capacitor blank.

8. The machine set forth in claim 7 wherein said forcing tool means comprises a rib forming means including spaced conductor contacting portions adjacent each end of each capacitor, said electrical means for heating being positioned adjacent each rib forming means and cooperating with said rib forming means to permit said rib forming means to deform the plastic end portions of the capacitors so as to form a plurality of ribs overlying and embedding the conductors in the body of the blank.

9. The machine set forth in claim 8 wherein the electrical means for heating the selected portions of the elongated conductors includes means for biasing portions of said electrical heating means into engagement with said conductors during movement of said conductors by said rib forming means into the ends of said capacitor.

10. The machine set forth in claim 9 wherein said rib forming means is located between said electrical means for heating the conductors, said rib forming means comprising a toothed member and said electrical means for heating comprising a pair of spaced electrodes.

11. The machine set forth in claim 8 wherein said electrical means for heating includes a pair of electrodes which overlie said conductors and are biased in one direction into engagement with one portion of the periphery of said conductors, said electrodes being shaped so as to permit said rib formers to move said conductors in a direction substantially at right angles to said one direction while said electrodes maintain firm electrical contact therewith.

References Cited by the Examiner
UNITED STATES PATENTS

| | | | |
|---|---|---|---|
| 2,455,136 | 11/1948 | Obert | 317—260 X |
| 2,637,798 | 5/1953 | Burge | 29—25.41 |
| 3,040,415 | 6/1962 | Rayburn | 29—25.42 |
| 3,117,364 | 1/1964 | Black | 29—25.42 |
| 3,145,448 | 8/1964 | Cotton | 29—25.42 |
| 3,243,675 | 3/1966 | Rayburn | 317—260 |

CHARLIE T. MOON, *Primary Examiner.*

WILLIAM I. BROOKS, *Examiner.*